(12) United States Patent
Fan et al.

(10) Patent No.: US 9,778,856 B2
(45) Date of Patent: Oct. 3, 2017

(54) BLOCK-LEVEL ACCESS TO PARALLEL STORAGE

(75) Inventors: Bin Fan, Pittsburgh, PA (US); Asim Kadav, Madison, WI (US); Edmund Bernard Nightingale, Redmond, WA (US); Jeremy E. Elson, Seattle, WA (US); Richard F. Rashid, Prescott, AZ (US); James W. Mickens, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 182 days.

(21) Appl. No.: 13/598,990

(22) Filed: Aug. 30, 2012

(65) Prior Publication Data

US 2014/0068224 A1    Mar. 6, 2014

(51) Int. Cl.
*G06F 12/00*    (2006.01)
*G06F 3/06*    (2006.01)

(52) U.S. Cl.
CPC ............ *G06F 3/0613* (2013.01); *G06F 3/064* (2013.01); *G06F 3/067* (2013.01)

(58) Field of Classification Search
None
See application file for complete search history.

(56) References Cited

U.S. PATENT DOCUMENTS

| | | | |
|---|---|---|---|
| 4,491,945 A | 1/1985 | Turner | |
| 4,780,870 A | 10/1988 | McHarg et al. | |
| 5,305,320 A | 4/1994 | Andrews et al. | |
| 5,408,649 A | 4/1995 | Beshears et al. | |
| 5,423,046 A | 6/1995 | Nunnelley et al. | |
| 5,446,915 A * | 8/1995 | Pierce | ............................ 712/11 |
| 5,553,285 A | 9/1996 | Krakauer et al. | |
| 5,621,884 A | 4/1997 | Beshears et al. | |
| 5,663,951 A | 9/1997 | Danneels et al. | |
| 5,778,384 A * | 7/1998 | Provino | ............ G06F 17/30233 |
| 5,914,878 A | 6/1999 | Yamamoto et al. | |
| 5,938,732 A | 8/1999 | Lim et al. | |
| 5,970,232 A * | 10/1999 | Passint et al. | ................. 709/238 |

(Continued)

FOREIGN PATENT DOCUMENTS

| | | |
|---|---|---|
| CN | 1664791 | 9/2005 |
| WO | 03/038628 A1 | 5/2003 |
| WO | 2010108368 A1 | 9/2010 |

OTHER PUBLICATIONS

Corbett et.al. "The Vesta Parallel File System" ACM 1996.*

(Continued)

*Primary Examiner* — Daniel C Chappell
*Assistant Examiner* — Tasnima Matin (57) ABSTRACT

The subject disclosure is directed towards one or more parallel storage components for parallelizing block-level input/output associated with remote file data. Based upon a mapping scheme, the file data is partitioned into a plurality of blocks in which each may be equal in size. A translator component of the parallel storage may determine a mapping between the plurality of blocks and a plurality of storage nodes such that at least a portion of the plurality of blocks is accessible in parallel. Such a mapping, for example, may place each block in a different storage node allowing the plurality of blocks to be retrieved simultaneously and in its entirety.

18 Claims, 7 Drawing Sheets

(56) References Cited

U.S. PATENT DOCUMENTS

| | | | |
|---|---|---|---|
| 6,230,252 B1* | 5/2001 | Passint et al. | 712/12 |
| 6,424,979 B1 | 7/2002 | Livingston et al. | |
| 6,577,613 B1 | 6/2003 | Ramanathan | |
| 6,850,489 B1 | 2/2005 | Omi et al. | |
| 6,871,295 B2 | 3/2005 | Ulrich et al. | |
| 6,963,996 B2 | 11/2005 | Coughlin | |
| 7,076,555 B1 | 7/2006 | Orman et al. | |
| 7,113,993 B1 | 9/2006 | Cappiello et al. | |
| 7,115,919 B2 | 10/2006 | Kodama | |
| 7,139,933 B2 | 11/2006 | Hsu et al. | |
| 7,171,491 B1 | 1/2007 | O'Toole et al. | |
| 7,180,875 B1 | 2/2007 | Neumiller et al. | |
| 7,184,958 B2 | 2/2007 | Kagoshima et al. | |
| 7,231,475 B1 | 6/2007 | Singla et al. | |
| 7,240,358 B2 | 7/2007 | Horn et al. | |
| 7,272,613 B2* | 9/2007 | Sim et al. | 709/223 |
| 7,342,876 B2 | 3/2008 | Bellur et al. | |
| 7,383,288 B2 | 6/2008 | Miloushev et al. | |
| 7,433,332 B2 | 10/2008 | Golden et al. | |
| 7,437,407 B2 | 10/2008 | Vahalia et al. | |
| 7,577,817 B2 | 8/2009 | Karpoff et al. | |
| 7,610,348 B2 | 10/2009 | Kisley et al. | |
| 7,657,581 B2 | 2/2010 | Orenstein et al. | |
| 7,725,437 B2 | 5/2010 | Kirshenbaum et al. | |
| 7,756,826 B2 | 7/2010 | Bots et al. | |
| 7,769,843 B2 | 8/2010 | Neuse et al. | |
| 7,774,469 B2 | 8/2010 | Massa et al. | |
| 7,797,453 B2 | 9/2010 | Meijer et al. | |
| 7,801,994 B2 | 9/2010 | Kudo | |
| 7,805,580 B2 | 9/2010 | Hirzel et al. | |
| 7,930,595 B2* | 4/2011 | Gooding | 714/37 |
| 8,001,352 B1 | 8/2011 | Chatterjee et al. | |
| 8,010,829 B1 | 8/2011 | Chatterjee et al. | |
| 8,074,107 B2 | 12/2011 | Sivasubramanian et al. | |
| 8,160,063 B2 | 4/2012 | Maltz et al. | |
| 8,181,061 B2 | 5/2012 | Nightingale et al. | |
| 8,234,518 B2 | 7/2012 | Hansen | |
| 8,261,033 B1 | 9/2012 | Slik et al. | |
| 8,327,370 B2 | 12/2012 | Atyam et al. | |
| 2002/0152293 A1 | 10/2002 | Hahn et al. | |
| 2002/0194245 A1 | 12/2002 | Simpson et al. | |
| 2003/0014393 A1* | 1/2003 | Kabra et al. | 707/3 |
| 2004/0153479 A1 | 8/2004 | Mikesell et al. | |
| 2005/0075911 A1 | 4/2005 | Craven, Jr. | |
| 2005/0078655 A1 | 4/2005 | Tiller et al. | |
| 2005/0094640 A1 | 5/2005 | Howe | |
| 2005/0262097 A1 | 11/2005 | Sim-Tang et al. | |
| 2006/0004759 A1 | 1/2006 | Borthakur et al. | |
| 2006/0015495 A1 | 1/2006 | Keating et al. | |
| 2006/0074946 A1 | 4/2006 | Pham | |
| 2006/0098572 A1 | 5/2006 | Zhang et al. | |
| 2006/0129614 A1 | 6/2006 | Kim et al. | |
| 2006/0280168 A1 | 12/2006 | Ozaki | |
| 2006/0288080 A1* | 12/2006 | Orszag et al. | 709/217 |
| 2007/0025381 A1 | 2/2007 | Feng et al. | |
| 2007/0156842 A1 | 7/2007 | Vermeulen et al. | |
| 2007/0204028 A1* | 8/2007 | Lee | 709/223 |
| 2008/0005275 A1 | 1/2008 | Overton et al. | |
| 2008/0010400 A1 | 1/2008 | Moon | |
| 2008/0098392 A1 | 4/2008 | Wipfel et al. | |
| 2008/0114827 A1 | 5/2008 | Gerber et al. | |
| 2008/0256138 A1* | 10/2008 | Sim-Tang | 707/202 |
| 2009/0006888 A1 | 1/2009 | Bernhard et al. | |
| 2009/0106269 A1 | 4/2009 | Zuckerman et al. | |
| 2009/0112921 A1 | 4/2009 | Oliveira et al. | |
| 2009/0113323 A1 | 4/2009 | Zhao et al. | |
| 2009/0183002 A1 | 7/2009 | Rohrer et al. | |
| 2009/0204405 A1 | 8/2009 | Kato et al. | |
| 2009/0259665 A1 | 10/2009 | Howe et al. | |
| 2009/0265218 A1 | 10/2009 | Amini et al. | |
| 2009/0268611 A1 | 10/2009 | Persson et al. | |
| 2009/0271412 A1 | 10/2009 | Lacapra et al. | |
| 2009/0300407 A1 | 12/2009 | Kamath et al. | |
| 2009/0307329 A1 | 12/2009 | Olston et al. | |
| 2009/0313438 A1 | 12/2009 | Krishnaprasad et al. | |
| 2010/0008230 A1 | 1/2010 | Khandekar et al. | |
| 2010/0008347 A1 | 1/2010 | Qin et al. | |
| 2010/0017444 A1* | 1/2010 | Chatterjee | G06F 17/30067 707/E17.007 |
| 2010/0094955 A1 | 4/2010 | Zuckerman et al. | |
| 2010/0094956 A1 | 4/2010 | Zuckerman et al. | |
| 2010/0161657 A1 | 6/2010 | Cha et al. | |
| 2010/0169287 A1* | 7/2010 | Klose | 707/692 |
| 2010/0191919 A1 | 7/2010 | Bernstein et al. | |
| 2010/0198888 A1 | 8/2010 | Blomstedt et al. | |
| 2010/0198972 A1 | 8/2010 | Umbehocker | |
| 2010/0250746 A1 | 9/2010 | Murase | |
| 2010/0332454 A1 | 12/2010 | Prahlad et al. | |
| 2010/0332818 A1 | 12/2010 | Prahlad et al. | |
| 2011/0022574 A1 | 1/2011 | Hansen | |
| 2011/0145818 A1 | 6/2011 | Vemuri et al. | |
| 2011/0153835 A1 | 6/2011 | Rimac et al. | |
| 2011/0161723 A1 | 6/2011 | Taleck et al. | |
| 2011/0208837 A1 | 8/2011 | Sartori | |
| 2011/0219208 A1* | 9/2011 | Asaad et al. | 712/12 |
| 2011/0246471 A1 | 10/2011 | Rakib | |
| 2011/0246735 A1 | 10/2011 | Bryant et al. | |
| 2011/0258290 A1 | 10/2011 | Nightingale et al. | |
| 2011/0258297 A1 | 10/2011 | Nightingale et al. | |
| 2011/0258482 A1 | 10/2011 | Nightingale et al. | |
| 2011/0258488 A1 | 10/2011 | Nightingale et al. | |
| 2011/0296025 A1 | 12/2011 | Lieblich et al. | |
| 2011/0307886 A1 | 12/2011 | Thanga et al. | |
| 2012/0041976 A1 | 2/2012 | Annapragada | |
| 2012/0042162 A1 | 2/2012 | Anglin et al. | |
| 2012/0047239 A1 | 2/2012 | Donahue et al. | |
| 2012/0054556 A1 | 3/2012 | Grube et al. | |
| 2012/0197958 A1 | 8/2012 | Nightingale et al. | |

OTHER PUBLICATIONS

Vrable, Michael Daniel, "Migrating Enterprise Storage Applications to the Cloud", Retrieved at <<http://cseweb.ucsd.edu/~mvrable/papers/dissertation.pdf>>, Dissertation, 2011, University of California, San Diego, pp. 1-112.

Vrable, et al., "Cumulus: Filesystem Backup to the Cloud", Retrieved at <<http://static.usenix.org/events/fast09/tech/full_papers/vrable/vrable.pdf>>, USENIX Association, 7th USENIX Conference on File and Storage Technologies, Feb. 24, 2009, pp. 225-238.

Ousterhout, et al., "The Case for RAMClouds: Scalable High-Performance Storage Entirely in DRAM", Retrieved at <<http://www.stanford.edu/~ouster/cgi-bin/papers/ramcloud.pdf>>, SIGOPS Operating Systems Review, vol. 43, No. 4, Dec. 2009, pp. 92-105.

"Introduction to the Azure Platform", Retrieved at <<http://msdn.microsoft.com/en-us/library/ff803364.aspx>>, Dec. 6, 2011, pp. 1-13.

Lesem, Steve, "Cloud Storage Strategy", Retrieved at <<http://cloudstoragestrategy.com/cloud-taxonomy/>>, Jan. 24, 2012, pp. 1-21.

International Search Report & Written Opinion for PCT Patent Application No. PCT/US2013/056070, Mailed Date: Nov. 20, 2013, Filed Date: Aug. 22, 2013, 11 Pages.

He, et al., "Performance Evaluation of Distributed iSCSI Raid", In Proceeding of the International Workshop on Storage Network Architecture and Parallel I/Os, Sep. 2003, 8 Pages.

U.S. Appl. No. 12/410,697, "Data Center Without Structural Bottlenecks", Maltz et al., filed Mar. 25, 2009.

U.S. Appl. No. 12/410,745, "Data Center Interconnect and Traffic Engineering", Maltz et al., filed Mar. 25, 2009.

U.S. Appl. No. 12/578,608, "Agile Data Center Network Architecture", Greenberg, et al., filed Oct. 14, 2009.

"Citrix Storage Delivery Services Adapter for NetApp Data ONTAP", Retrieved at: <<http://citrix.com/site/resources/dynamic/partnersDocs/datasheet_adapter.pdf>>, Retrieved date: Mar. 9, 2010, Citrix Systems, Citrix Storage Delivery Services Data Sheet, 2008, 2 pages.

(56) References Cited

OTHER PUBLICATIONS

"EMC RecoverPoint Family: Cost Effective Local and Remote Data Protection and Disaster Recovery Solution", Retrieved at: <<http://www.emc.com/collateral/software/data-sheet/h2769-emc-recoverpoint-family.pdf>>, Retrieved date: Mar. 9, 2010, EMC Corporation, Data Sheet H2769.8, 2010, 3 pages.

Mohamed et al., "Extensible Communication Architecture for Grid Nodes", Retrieved at: <<http://www.computer.org/portal/web/csd/doi/10.1109/itcc.2004.1286587>>, Retrieved date: Apr. 23, 2010, International Conference on Information Technology: Coding and Computing (ITCC'04), vol. 2, Apr. 5-7, 2004, Las Vegas, Nevada, 1 page.

Akturk, "Asynchronous Replication of Metadata Across Multi-Master Servers in Distributed Data Storage Systems", A Thesis Submitted to Louisiana State University and Agricultural and Mechanical College, Dec. 2009, 70 pages.

Bafna, et al., "CHIRAYU: A Highly Available Metadata Server for Object Based Storage Cluster File System", Retrieved at: <<http://abhinaykampasi.tripod.com/TechDocs/ChirayuPaper.pdf>>, IEEE Bombay Section, Year 2003 Prof K Shankar Student Paper & Project Contest, Apr. 2003, 6 pages.

Buddhikot, et al., "Design of a Large Scale Multimedia Storage Server", Journal Computer Networks and ISDN Systems, vol. 27, Issue 3, Dec. 1994, pp. 1-18.

Chen, et al., "Replication-Based Highly Available Metadata Management for Cluster File Systems", 2010 IEEE International Conference on Cluster Computing, Sep. 2010, pp. 292-301.

Fan, et al., "A Failure Recovery Mechanism for Distributed Metadata Servers in DCFS2", Seventh International Conference on High Performance Computing and Grid in Asia Pacific Region, Jul. 20-22, 2004, 7 pages.

Fu, et al., "A Novel Dynamic Metadata Management Scheme for Large Distributed Storage Systems", Proceedings of the 2008 10th IEEE International Conference on High Performance Computing and Communications, Sep. 2008, pp. 987-992.

Fullmer, et al., "Solutions to Hidden Terminal Problems in Wireless Networks", Proceedings of the ACM SIGCOMM '97 Conference on Applications, Technologies, Architectures, and Protocols for Computer Communications, Cannes, France, Oct. 1997, pp. 39-49.

Lang, "Parallel Virtual File System, Version 2", Retrieved at: <<http://www.pvfs.org/cvs/pvfs-2-7-branch.build/doc/pvfs-2-guide/pvfs2-guide.php>>, Sep. 2003, 39 pages.

Sinnamohideen, et al., "A Transparently-Scalable Metadata Service for the Ursa Minor Storage System", USENIX ATC'10 Proceedings of the 2010 USENIX Conference, Jun. 2010, 14 pages.

Weil, et al., "CRUSH: Controlled, Scalable, Decentralized Placement of Replicated Data", Proceedings of SC'06, Nov. 2006, 12 pages.

Weiser, "Some Computer Science Issues in Ubiquitous Computing", Retrieved at: <<https://www.cs.ucsb.edu/~ravenben/papers/coreos/Wei93.pdf>>, Mar. 1993, 14 pages.

Isard, et al., "Dryad: Distributed Data-Parallel Programs from Sequential Building Blocks", in Proceedings of the 2nd ACM SIGOPS/EuroSys European Conference on Computer Systems, Mar. 21, 2007, 14 pages.

Kennedy, "Is Parallel Computing Dead", Retrieved at: <<http://www.crpc.rice.edu/newsletters/oct94/director.html.>>, Parallel Computing Newsletter, vol. 2, Issue 4, Oct. 1994, 2 pages.

Rhea et al., "Maintenance-Free Global Data Storage", IEEE Internet Computing, Sep.-Oct. 2001, pp. 40-49.

"First Office Action and Search Report Issued in Chinese Patent Application No. 201380045740.0", Mailed Date: Oct. 28, 2016, 16 Pages.

"Second Office Action and Search Report Issued in Chinese Patent Application No. 201380045740.0", Mailed Date: Apr. 1, 2017, 16 Pages.

\* cited by examiner

BLOCK-LEVEL ACCESS TO PARALLEL STORAGE

BACKGROUND

Enterprises desire innovative solutions to their growing informational and computational needs. Conventional enterprise-level computing systems employ thin clients, which depend heavily on a cumbersome multi-layer hardware infrastructure (e.g., a server) to effectuate traditional computer functionality. The thin client stands in contrast to a traditional computer that is designed to perform computing locally. The most common type of modern thin client is a low-end computer terminal capable of providing a graphical user interface to an end-user, but not much else. The remaining functionality, in particular the operating system, is provided by a server. Such technology is often burdened with latency and expensive computation costs attributed to implementing hierarchical networking architectures (e.g., Local Access Networks (LANs)).

Other computing technologies are transitioning away from traditional networking/storage architectures and towards flat architectures. With respect to large data centers, for example, common hierarchical networking architectures are no longer suitable for large data centers due to high latency costs and complex software. Typical flat architectures (e.g., Microsoft® Flat Datacenter Storage) are parallelized, representing a major shift from the hierarchical architectures, and interconnect virtual machines and virtual storage volumes across switched Ethernet fabrics. Some existing flat architectures distribute the virtual storage volumes across nodes where data is stored and at some point, transmitted over a network to be processed elsewhere. Other architectures are configured to access locally stored data and distribute computing tasks amongst computing nodes in order to avoid transmitting the data over a network.

While the flat architectures provide many benefits, the enterprise-level computing systems, unlike the large data centers, present a different set of requirements that are not fulfilled with current technologies. For example, such systems need to satisfy different end-user performance standards (e.g., a stricter level of acceptable performance and end-user satisfaction). Current trends indicate that enterprise-level computing systems tend to be constrained by the rigidity of traditional hierarchical architecture and are transitioning towards implementing flat architectures. Because such flat architectures are designed for the large data centers, native interfaces are not suitable for block-level input/output between stored data and the end-user computing device.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards implementing block-level input/output functionality for enterprise-level computing systems and thus, providing end-user computing devices with block-level access to parallel storage. In one aspect, the parallel storage may correspond to a flat architecture that enables existing software programs with read/write access to stored data at a rate equal to or greater than an average data transfer rate associated with local storage.

In one aspect, a translator component of the parallel storage partitions the file data into blocks. The translator component may use a mapping scheme to assign blocks of the file data to block-level addresses/locations within the storage nodes. Based upon these locations, the translator component may access one or more of these blocks in parallel when handling the input/output operations. In one aspect, the input/output operations may be directed towards a virtual storage extent in which adjacent portions map to non-adjacent block-level addresses within an address space associated with the storage nodes. Accordingly, the translator component may retrieve at least a portion of the adjacent portions concurrently.

In another aspect, an interface component running on the end-user computing device may interact with an operating system. The interface component may access block-level addresses for byte sequences within a binary large object. When a software program initiates file system input/output operations directed to the byte sequences, the operating system uses the interface component to transform these operations into block-level, parallelized input/output operations. The interface component may communicate the block-level, parallelized input/output operations to the storage mechanism over a data network.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards one or more parallel storage components that provide a computing device with parallelized block-level access to stored file data. In one example implementation, the computing device initiates file-level input/output directed to file-level addresses (e.g., byte sequence locations). One parallel storage component translates these addresses into block-level addresses in order to handle the file-level input/output as block-level input/output. The parallel storage component may respond by returning requested data (e.g., in response to a read operation) and/or notifications for completed input/output (e.g., in response to a write operation or a flush operation).

As described herein, an example parallel storage component may support commodity software programs, such as unmodified (e.g., desktop) software applications and other existing software/hardware components (e.g., operating system components). After the parallel storage component overlays a local address space over corresponding block locations on multiple disks, a local file system driver may instruct the example parallel storage component to perform parallelized block-level input/output on remote file data as stored. Another example parallel storage component may allow networked computing devices to mount known file system drivers on top of the parallel storage, such as an existing POSIX file system over a Binary Large Object (BLOB) store, while achieving improved input/output performance.

The other parallel storage component, which may be referred to herein as a storage device driver, can generate a disk interface, such as Serial ATA (SATA), through which the commodity software programs can communicate file-level input/output directed towards remote disks. The file system driver, or another operating system component, may communicate the file-level input/output operations requesting that data is read from and/or written to a virtual storage extent (e.g., a virtual hard disk file). The one or more parallel storage components can transform the file-level input/output operations into parallelized, block-level input/output operations for execution across a plurality of storage nodes.

Via the one or more parallel storage components, an operation system component may network-boot a computing device, such as a physical computer or a virtual machine, using the virtual storage extent. The one or more parallel storage components may network-boot by fetching one or more operating system components using Internet Small Computer System Interface (iSCSI) or ATA over Ethernet (AoE) and then, mounting the virtual storage extent to access application binaries and personal user data. Another example implementation may employ a modified version of the Microsoft® Windows® Preinstallation environment (WinPE™).

Parallel storage generally refers to architecture in which data storage/retrieval tasks are concurrently distributed amongst storage nodes and executed. An example parallel storage architecture combines a full bi-sectional bandwidth network for the computing devices with statistically multiplexed disks such that block-level input/output achieves a same or better transfer rate when compared to local disks. The computing devices (e.g., desktop computers) and the statistically multiplexed disks may occupy a same geographic area or physical site (e.g., a campus). To illustrate one example embodiment, an office building, or any equivalent structure, forms a physical boundary within which the computing devices and the statistically multiplexed disks are substantially co-located. Such architecture may result in improved throughput or latency for the computing devices. In another example embodiment, the parallel storage may refer to an architecture configured to achieve fine grained, parallelized input/output for (e.g., desktop) computer groups—typically formed around structural (e.g., departmental) and/or functional boundaries.

One embodiment of parallel storage can refer to a Binary Large Object (BLOB) based storage system, such as Microsoft® Flat DataCenter Storage (FDS) as described herein, in which remote disks function as local storage to other computing devices. One or more parallel storage components can transform a logical byte sequence comprising the virtual storage extent and a mapping scheme into an address space representing individual block locations within storage nodes. The one or more parallel storage components may translate file-level addresses associated with the virtual storage extent into block-level addresses based upon the address space. Using these block-level addresses, the one or more parallel storage components may generate parallelized block-level input/output operations comprising compatible BLOB storage commands that correspond to the file-level input/output operations. The one or more parallel storage components may instruct the storage nodes to concurrently execute the BLOB storage commands on the remote disks.

It should be understood that any of the examples herein are non-limiting. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used in various ways that provide benefits and advantages in computing, data storage and enterprise-level computing in general.

Figure 1:
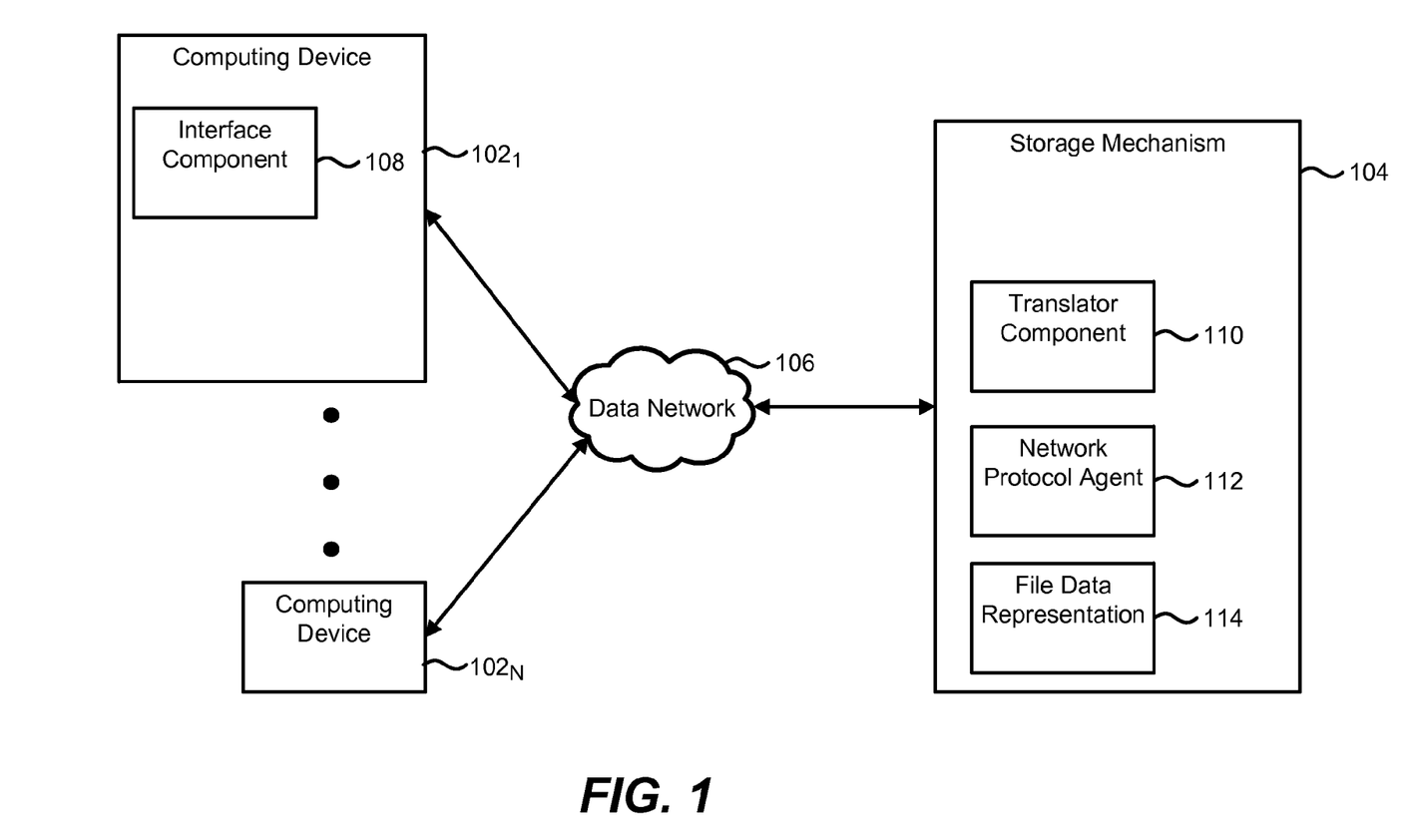
FIG. 1 is a block diagram illustrating an example system for providing block-level access to file data from parallel storage according to one example implementation.

FIG. 1 is a block diagram illustrating an example system for providing block-level access to file data from parallel storage according to one example implementation. Within the example system, a plurality of computing devices $102_{1\ldots N}$ (hereinafter the plurality of computing devices 102) may initiate file-level input/output directed towards a parallelized storage sub-system referred to herein as a storage mechanism 104. Via a data network 106, the storage mechanism 104 may query one or more storage nodes and return one or more blocks of the file data in response to parallelized input/output as described herein. It is appreciated that the file data may be non-locally stored/remote file data at a same or different site from the computing devices 102.

As described herein, the parallel storage refers to an architecture enabling a local processor (CPU) at one of the computing devices 102 to access data in any remote disk at a same throughput as a local disk or a higher throughput. Such architecture may be configured for building-wide deployments in which desktop computers and remote disks are co-located within a physical boundary and communicably coupled to each other. Over a full bi-sectional bandwidth network also confined within the building, various parallel storage components manage simultaneous reads/writes of data and/or other file system operations (e.g., a flush operation) at a rate equal to or greater than local storage.

Microsoft® Flat Datacenter Storage (FDS) is an example embodiment of such architecture and generally refers to a parallelized, binary large object (BLOB)-based storage system. Such parallel storage components may implement, for an existing POSIX file system for example, a block-level interface over a native BLOB interface that is over multiple remote disks (e.g., physical hard disks). The parallel storage architecture allows an operating system of the computing device $102_1$, for example, to mount the POSIX file system on top of the FDS binary large object (BLOB) store with enhanced performance.

One or more parallel storage components handle the parallelized, block-level input/output according to one example implementation. As described below, example components include an interface component 108, a translator component 110 and/or other software components. The interface component 108 includes one or more software programs configured to support the computing devices 102, such as the computing device $102_1$. One example software program includes a device driver that translates file-level addresses to block-level addresses. Example block-level addresses refers to one or more discrete locations within a set of storage nodes that may be accessed in parallel. The translator component 110, therefore, instructs another software program, such as a network protocol agent 112, to retrieve corresponding file data blocks from these locations concurrently, and then provide such blocks to the interface component 108.

The translator component 110 may be configured to partition the file data into a plurality of blocks and map the block-level addresses to the plurality of data blocks. The translator component 110 records each mapping in a file data representation 114, which may be used by the interface component 108 to handle the parallelized input/output initiated by the computing device $102_1$ according to one example implementation. The file data representation 114 correlates the block-level addresses with a local file system address space such that the file system representation 112 may be mounted by a local file system driver, enabling unmodified desktop applications to initiate file-level input/output.

The data network 106 may implement a full bisection bandwidth network that communicably couples the plurality of computing devices 102 and the storage mechanism 104. The data network 106 may provide a substantially uncongested path from remote disks to processors (CPUs) through which the storage mechanism 104 communicates file data blocks to the plurality of computing devices 102 with substantially equal throughput, according to one example implementation. As a result, the example system depicted in FIG. 1 ordinarily has an aggregate input/output (I/O) bandwidth substantially equivalent to or greater than a data transfer rate of a desktop computer or the like using local storage.

By monitoring parallelized input/output for a time period, the interface component 108, the translator component 110 and/or another software component may produce various statistics summarizing execution of such input/output (e.g., regarding performance). Based upon these statistics, the translator component 110 may modify a current mapping scheme between byte sequences of the file data and block locations corresponding to the storage mechanism 104. As an example, some statistics may indicate poor performance in terms of bandwidth when compared with a local hard disk rate. The translator component 110, as a response, may use random assignment instead of a deterministic one. The translator component 110 alternatively may increase a block size and/or otherwise increase a number of available storage nodes, which may result in more parallel data reads/writes.

Figure 2:
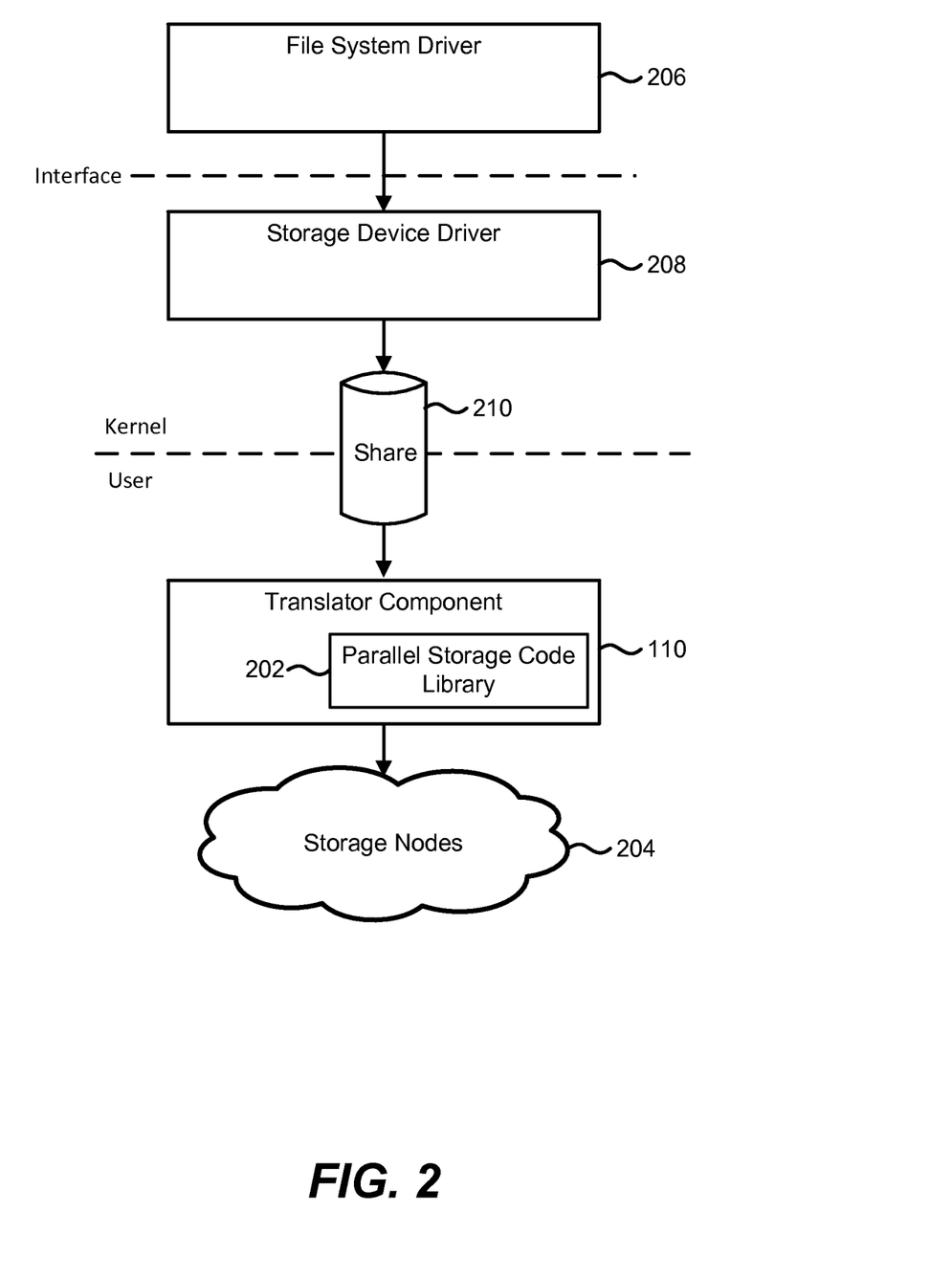
FIG. 2 is a block diagram illustrating example architecture for parallel storage access according to one example implementation.

FIG. 2 is a block diagram illustrating example architecture for parallel storage access according to one example implementation. In order to parallelize file-level input/output, the translator component 110 may include a parallel storage code library 202 configured to access/retrieve stored file data from storage nodes 204 and/or store new file data. One example embodiment of the storage nodes 204 include a configuration of servers for a BLOB-based storage system, commonly referred to as tract servers, as described herein.

An operating system running in a computing device (e.g., a desktop computer) initiates file-level input/output operations using a software program known as a file system driver 206. In turn, the file system driver 206 invokes functionality provided by the storage device driver 208 for handling the file-level input/output operations. One example implementation may access address information from share 210 that identifies locations within the storage nodes 204 from which a plurality of blocks may be accessed/retrieved in parallel. The address information, for example, indicates a random assignment between the plurality of blocks and the storage nodes 204. Such an assignment may result in a storage node group that is substantial in size and/or capable of currently providing a considerable portion of the plurality of blocks to the device driver 208.

Alternatively, the address information may indicate that each of the storage nodes 204 is configured to store non-adjacent pairs of the plurality of blocks. This type of addressing may result in improved input/output bandwidth due to having the blocks distributed among more storage nodes. Such a distributed placement results in an increased number of storage nodes to simultaneously serve a contiguous block sequence in response to input/output operations. Another example implementation may involve more deterministic addressing in which, based upon a mathematical technique, the translator component 110 assigns blocks to locations within the storage nodes.

In one example implementation, the share 210 may include a shared memory buffer that allows zero-copy communication between user-mode and kernel-mode components of the example architecture, such as a parallelized, BLOB based storage architecture. To minimize overhead related to exchanging data across a user-kernel boundary, the example architecture may use Microsoft® Windows® Advanced Local Procedure Calls (ALPC), which typically use shared memory pages to enable zero-copy inter-process communications (IPC). In one alternative implementation, the example architecture may employ IPC or Input/Output Control (IOTCL) mechanisms to exchange data between kernel-mode and user-mode. As another alternative, the example architecture may implement the parallel storage code library 202 in kernel-mode.

When a software application issues a file system operation, the file system driver 206 communicates one or more input/output (I/O) request packets (IRPs) to the storage device driver 208. The one or more packets are forwarded to the translator component 110, which transforms the file system operation into one or more corresponding parallel storage commands. Regarding a read/write file system operation, the translator component 110 may use the parallel storage code library 202 to invoke respective read/write commands on suitable storage nodes. Via the storage device driver 208, the translator component 110 may relay any response from such storage nodes to the file system driver 206. For example, the storage device driver 208 may communicate completion notifications for the file system operation after all of the read/write commands finished successfully.

The parallel storage architecture may implement an asynchronous messaging protocol to efficiently exchange data between the storage nodes 204, the file system driver 206, the storage device driver 208 and the translator component 110. The translator component 110 is multi-thread safe and maximizes throughput by issuing multiple block-level read/write commands in parallel. As an option, the file system driver 206 also may issue flush commands to the translator component 110. A flush command generally instructs that the storage device driver 208 and the translator component 110 to complete any outstanding input/output operations before handling new operations. Between flush commands, the translator component 110 maintains multiple input/output operations in flight, but if the file system driver 206 issues input/output operations to overlapping byte ranges, the translator component 110 may order these operations to maintain serializability.

Via the storage device driver 208, the translator component 110 may disable flush (file system) operations to improve performance according to one example implementation. Even with such flush operations enabled, the file system drivers may still aggressively pre-fetch data when desktop software applications on multiple computing devices issue numerous simultaneous I/O requests to access the file data. These computing devices may include desktop computers, laptop computers, mobile devices, tablets and/or the like.

Each of the storage nodes 204 may include a data network adaptor (e.g., a Network Interface Card, such as a 10 (ten) GB/s NIC) and a raw hard disk. The storage nodes 204, sometimes referred to as dedicated tract servers, may be remote or at a same site as the desktop computer. Each tract server may instantiate as a logical network front-end to a single disk. Machines with multiple disks may maintain one tract server per disk. The storage mechanism may configure each storage node with a network bandwidth capacity substantially equal to or greater than an available storage bandwidth per disk. If, for example, a SAS disk has a read performance of about 120 MByte/sec, or about 1 gigabit/sec, in one implementation the storage nodes are provisioned with at least as 1 gigabit/sec of network bandwidth.

Figure 3:
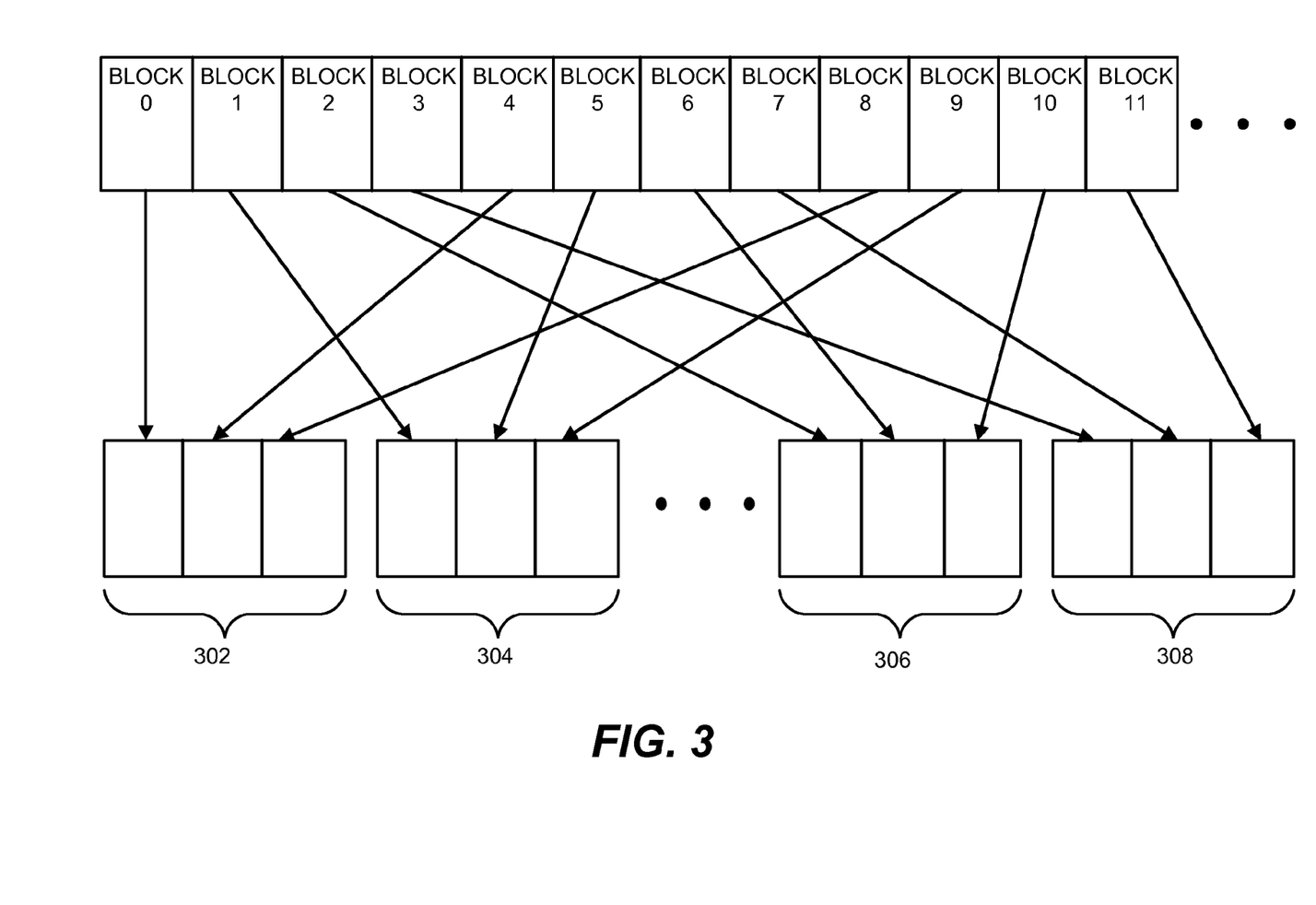
FIG. 3 is a representation of an example mapping scheme for a virtual storage extent according to one example implementation.

FIG. 3 is a representation of an example mapping scheme for a virtual storage extent according to one example implementation. It is appreciated that the example mapping scheme is among numerous other mapping schemes envisioned by, but not limited by, the described embodiments in the present disclosure. The example mapping scheme may be configured to convert byte offsets within the virtual storage extent into block offsets within a storage node group address space. It is also appreciated that a virtual hard disk constitutes one example of the virtual storage extent on which parallelized input/output operations may be performed. In addition, the example mapping scheme may be applicable to other virtual storage technologies.

As illustrated in FIG. 3, a plurality of storage nodes may be configured to retain, in nonvolatile memory, file data related to the virtual storage extent. The file data may be partitioned into a plurality of blocks of which BLOCK0 to BLOCK11 may represent a portion thereof. The plurality of blocks represent the virtual storage extent when taken together and may be addressed as a logical byte sequence. The plurality of blocks may be further partitioned into sets of blocks in which each set refers to a contiguous address space within the virtual storage extent. Within each set, each block is mapped to a specific location (e.g., logical address or index) in a different storage node in a storage node group.

The example mapping scheme illustrated by FIG. 3 includes storage nodes 302, 304, 306 and 308 forming an example storage node group configured to perform nested striping for BLOCK0 to BLOCK11 of the plurality of blocks. In response to input/output operations, the example storage group may be configured to write/read data associated with a contiguous sequence of four blocks in parallel. Other blocks of the plurality of blocks may be striped by other storage nodes. According to one example implementation, the example storage node group is one amongst numerous storage node groups in which each storage node group also includes four storage nodes (e.g., such storage node groups may be referred to herein as segments).

As further illustrated, an example first set of blocks may include a contiguous block sequence comprising BLOCK0, BLOCK1, BLOCK2 and BLOCK3 in which each block maps to a first location of a respective one of the storage nodes, e.g., BLOCK0 maps to the first location of the storage node 302, BLOCK1 maps to the first location of the storage node 304, BLOCK2 maps to the first location of the storage node 306 and BLOCK3 maps to the first location of the storage node 308. Various software/hardware components (e.g., the storage mechanism 104 of FIG. 1) associated with the storage nodes may write each block to the first location at each storage node in parallel and record a corresponding block-level address.

An example second set of blocks may include a contiguous block sequence comprising BLOCK4, BLOCK5, BLOCK6 and BLOCK7 in which each block maps to a second location of a respective one of the storage nodes 302, 304, 306 and 308. After writing the example second set of blocks to the mapped second location, another corresponding block-level address is recorded for each of these blocks. In response to an input/output operation requesting the example second set of blocks, the storage nodes 302, 304, 306 and 308 may transmit BLOCK4, BLOCK5, BLOCK6 and BLOCK7, respectively, in parallel to the computing device associated with the virtual storage extent.

An example implementation of the block-level address may be represented as a storage node identifier and a block identifier. For instance, BLOCK1 may map to an address comprising a GUID for the storage node 304 and an index number for the first location within the storage node 304 (e.g., index=zero (0)). BLOCK2 may map to an address comprising a GUID for the storage node 306 and, similar to BLOCK1, an index number for the first location within that node (e.g., index=zero (0)). As another example, a block-level address for BLOCK4 may comprise a GUID for the storage node 302 and an index number for a second location within that node (e.g., index=one (1)). By way of yet another example, a block-level address for BLOCK11 may include a GUID for the storage node 308 and an index corresponding to a last location (e.g., index=two (2)).

Because the first set of blocks is partitioned amongst different storage nodes, the storage mechanism may retrieve each corresponding block from the storage node 302, the storage node 304, the storage node 306 and the storage node 308 in parallel and/or stream the first set of blocks to a computing device at a data transfer rate equal to or greater than a pre-determined rate. An example of such a pre-determined rate may be a standard transfer rate from a local storage device, such as a hard disk. The pre-determined rate may be adjusted under certain conditions, including changing customer needs, load balancing, resource availability and/or the like.

In one example embodiment, the virtual storage extent is logically stored in a MICROSOFT BLOB (e.g., a byte sequence of any length associated with a 128-bit GUID). When handling BLOB level input/output, the storage mechanism may read/write data as tracts where each tract may refer to a pre-defined number of bytes within the BLOB (e.g., ranging from eight (8) MB to four (4) KB (4096 bytes)). Each tract may be indexed in sequential order starting with zero (0), which also may serve as a tract locator/identifier or a portion thereof. One example tract locator/identifier may be computed as a sum of a BLOB GUID (e.g., a 128-bit BLOB GUID) and a tract identifier (e.g., a 64-bit tract number) modulo a total number of tracts. Thus, a suitable block-level address for the example mapping scheme may comprise some mathematical combination of the BLOB GUID, the tract identifier and a block index within the tract. As illustrated in FIG. 3, for instance, BLOCK4 maps to a block-level address that is generated using at least a tract identifier for the storage node 302 and a block index of one (1).

One example implementation of the mapping scheme, which is referred to herein as nested striping, may provide block-level addressing between linear byte ranges and tracts. The mapping scheme may define a segment size as a logical group of one or more tracts. Hence, a segment of N bytes comprises striped file data for a linear byte range of N bytes. Modifying the segment size may affect disk parallelism functionality for sequential and/or random input/output workloads. As illustrated in FIG. 3, a segment size of four (4) tracts results in sequential input/output being disseminated across two disks. It is appreciated that other implementation may use other segment sizes (e.g., a segment size of 128 tracts).

Within each segment, the example mapping scheme may write (e.g., stripe) linear byte ranges using a configurable block size that provides wide striping while amortizing seek latencies and rotational delays during disk writes. For example, a block size of one-hundred and twenty-eight (128) KB may be suitable. As an additional constraint, according to one example implementation, the example mapping scheme may direct the storage mechanism to store each block such that it substantially fits within a single tract. The example mapping scheme may define access profiles that store different mapping schemes for various scenarios. For example, priority may be given to one department (e.g., Research and Development) over another department (e.g., Human Resources) in an enterprise with respect to computing resource and performance guarantees.

The example mapping scheme may define a tract size configured to provide high throughout and quick data recovery. One example implementation may configure the tract size to be substantially equal to a block size, such as a Microsoft® NTFS® block size (e.g., four (4) to sixty-four (64) KB). Assigning the plurality of blocks, according to such a scheme, may store only one block in each of the storage nodes. Hence, the storage mechanism may concurrently retrieve/write at least a portion of the plurality of blocks when requested.

A parallel storage component (e.g., the translator component 110 of FIG. 1) may modify the example mapping scheme, as described herein, before handling future input/output directed towards the example storage node group. One example implementation fine-tunes the example mapping scheme in response to performance-related statistics associated with the storage nodes 302, 304, 306 and 308. According to another example implementation, the parallel storage component modifies the example mapping scheme in order to enable various levels of input/output parallelism for computing devices.

Figure 4:
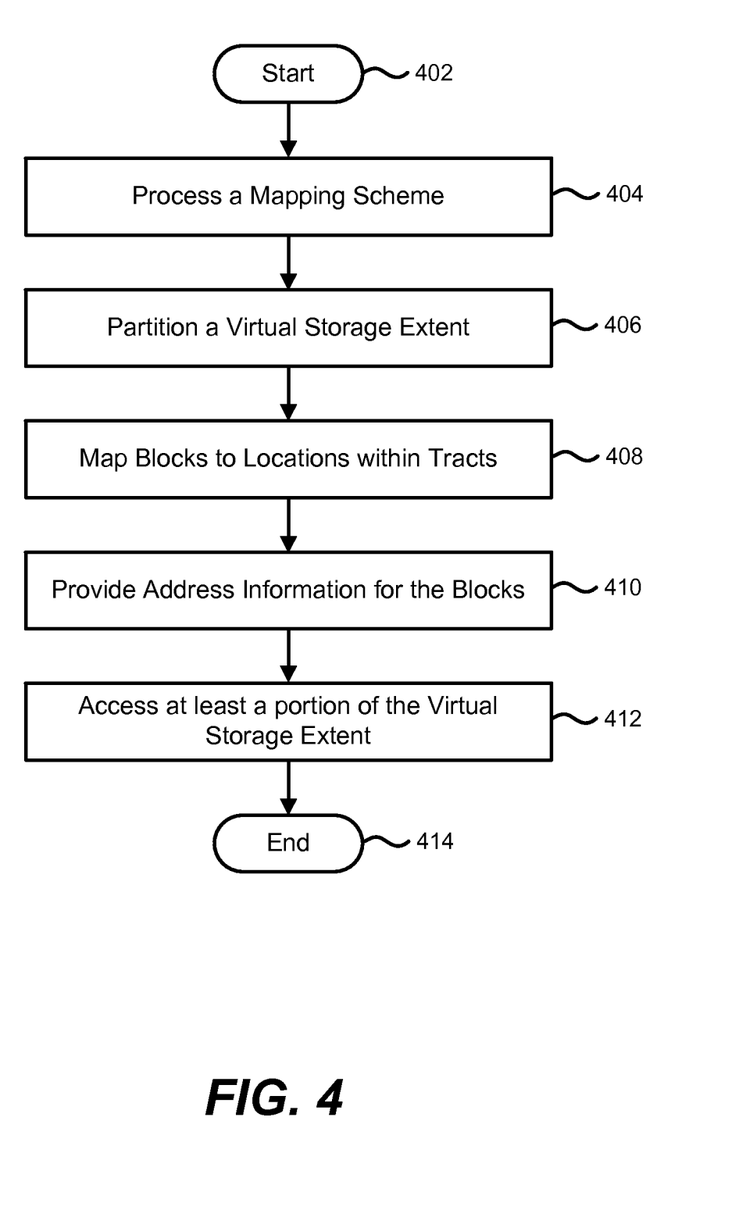
FIG. 4 is a flow diagram illustrating example steps for providing block-level access to file data according to one example implementation.

FIG. 4 is a flow diagram illustrating example steps for providing block-level access to file data within parallel storage according to one example implementation. One or more of the example steps may be performed by one or more storage mechanism components (e.g., the translator component 110 and/or the network protocol agent 112 of the storage mechanism 104). The example steps commence at step 402 and proceed to step 404 at which a mapping scheme for the file data is processed.

Step 406 uses the mapping scheme to partition a virtual storage extent into a plurality of blocks. According to one example implementation, the mapping scheme may prescribe a standard block size such that sequential input/output is performed substantially in parallel. The mapping scheme additionally may define a tract size in terms of the standard block size. As an example, the translator component may configure a storage node to serve sixteen (16) non-contiguous blocks of the virtual storage extent to an interface component (e.g., the interface component 108 of FIG. 1) within a computing device.

The following equations depict deterministic addressing as an example mapping scheme for converting a virtual storage extent offset (e.g., a block offset/index) into a combination of a tract identifier and tract offset:

$$X = \left\lfloor \frac{diskOffset \ \% \ (tractSize \cdot segmentSize)}{blockSize} \right\rfloor \quad (1)$$

$$tractId = \left\lfloor \frac{diskOffset}{tractSize \cdot segmentSize} \right\rfloor \cdot segmentSize + (X \% \ segmentSize) \quad (2)$$

$$tractOffset = \left\lfloor \frac{X}{stripeSize} \right\rfloor \cdot blockSize + (diskOffset \ \% \ blockSize) \quad (3)$$

Equation (1) determines a total size of a segment in bytes and computes a remainder X between the diskOffset and the total size. The remainder X is converted from bytes into blocks based upon blockSize. Hence, the total segment size (in bytes) also represents a total number of blocks for partitioning a contiguous address space amongst different tracts ranging in number between at least segmentSize and the total number of blocks. Equation (2) uses remainder X to compute an index, known as the tractId or tract identifier, for which tract stores the block at diskOffset. Equation (3) may use remainder X to compute an offset, known as trackOffset, corresponding to a block location within the tract associated with tractId. Therefore, a byte sequence starting at diskOffset maps to a block-level address comprising tractId and tractOffset.

Step 408 refers to mapping the plurality of blocks to locations within tracts being managed by one or more storage nodes. A location may be randomly or deterministically assigned to each block. One example implementation of the translator component may use the mapping scheme to divide the plurality of blocks into sets in which each set comprises a contiguous range of blocks and corresponds to a same tract offset but to different tracts. As a result, each tract may store every Nth block of the virtual storage extent where N refers to a tract index. Accessing the tracts in parallel facilitates input/output of the entire range between the computing device and the storage node.

Step 410 is directed towards providing address information for the locations corresponding to the plurality of the blocks. Step 412 represents accessing two or more portions of the virtual storage extent in parallel. In one example implementation, the one or more storage nodes may simultaneously or near-simultaneously write one of the respective portions to the non-volatile memory. Each portion may be stored at a location within a corresponding storage node that facilitates concurrent retrieval of the two or more portions from the one or storage nodes. As an example, if each storage node is capable of serving eight (8) blocks during one cycle, each portion includes eight (8) blocks of the virtual storage extent.

In one example implementation, the storage mechanism exposes a virtual SATA disk to which one or more user mode software programs may communicate input/output operations. The storage mechanism may assign portions of the virtual SATA disk to separate tracts. Thus, each block (e.g., one or more byte(s)) in the virtual SATA disk is addressed using a tract identifier and an offset (e.g., an index) within the tract. An unmodified file system driver (e.g., NTFS, ext3 or any other compatible file system) may mount the virtual SATA disk and utilize a driver program (e.g., a virtual disk driver) to initiate file system operations (e.g., read and/or write operations) on stored file data. From the perspective of the file system driver, however, the virtual SATA disk exports a linear address space (e.g., a range of bytes). Step 414 terminates the example steps depicted in FIG. 4.

Figure 5:
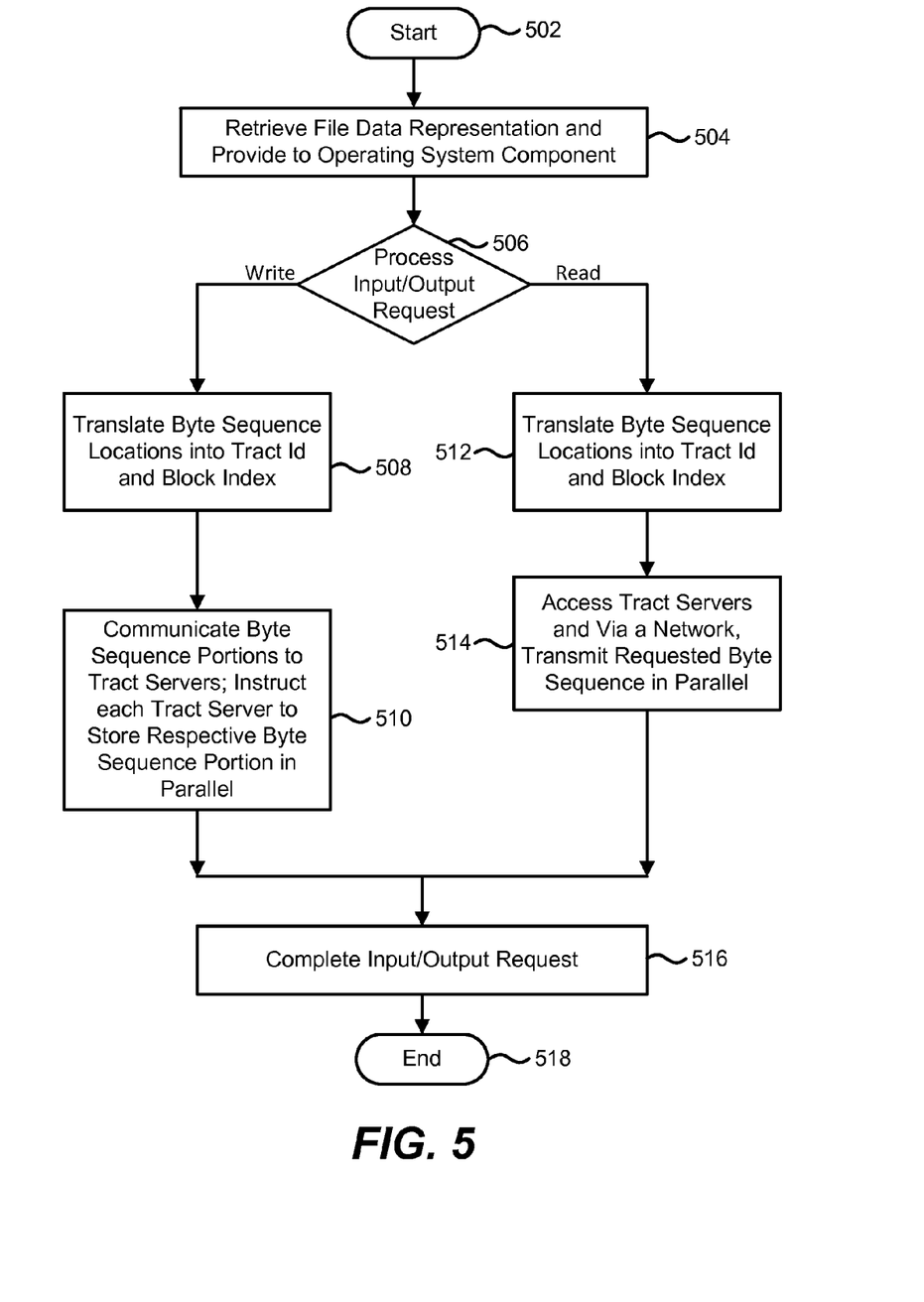
FIG. 5 is a flow diagram illustrating example steps for parallelizing input/output directed to file data according to one example implementation.

FIG. 5 is a flow diagram illustrating example steps for parallelizing input/output directed to file data according to one example implementation. One or more of the example steps may be performed by one or more parallel storage components (e.g., the interface component 108, the translator component 110 and/or the network protocol agent 112 of FIG. 1). The example steps commence at step 502 and proceed to step 504 at which a representation of the file data is retrieved and provided to an operating system component.

Such a file data representation may capture an address space for a byte sequence encompassing the file data. The address space may associate byte sequence locations to block-level addresses within one or more tracts. The one or more parallel storage components may configure the file data representation to be file system compatible such that the operating system component (e.g., a file system driver) may initiate file-level input/output on behalf of a software program. Via the file data representation, the one or more parallel storage components may translate the file-level input/output into parallelized block-level input/output and then, executed as described herein.

A virtual storage extent, according one example embodiment, may maintain file data within one or more storage volumes for at least one machine (e.g., virtual machine, physical machine and/or the like). Using one of the parallel storage components, one operating system component may mount the virtual storage extent and expose local software programs running on an end-user computing device to the one or more storage volumes. As an option, another operating system component may network-boot the virtual machine (e.g., directly) from the virtual storage extent. The virtual machine may function as an end-user computing device by running various software programs, including the operating system, and providing read/write access to the storage volumes. One of the parallel storage components may generate an interface through which these software programs (e.g., another operating system component) communicate input/output requests directed to the file data.

Step 506 processes a file-level input/output request and determines whether data is to be written to or retrieved from parallel storage. If the input/output request refers to a write operation, step 506 proceeds to step 508. In one example implementation, the write operation may be a part of a flush operation comprising numerous write operations. If the input/output request indicates a read operation, step 506 proceeds to step 512.

Steps 508 and 510 are directed to handling the write operation at a block-level granularity. Step 508 refers to translating byte sequence locations into the block-level addresses. Each block may include a pre-defined number of bytes (e.g., 4 KB). Each block-level address may comprise a tract identifier and a block index corresponding to a specific block in a storage node known as a tract server. As an example, each block of the byte sequence is assigned to a tract identifier using a remainder computed between a related byte sequence number and a number of accessible tracts. One or more blocks that map to one of the tract servers (denoted by the tract identifier) may form a byte sequence portion. The byte sequence portion may be selected such that a contiguous number of blocks within the byte sequence may be accessed in parallel from the tract servers. Hence, these blocks are located at equidistant intervals along the byte sequence. Alternatively, the byte sequence portion may include one or more random-selected blocks.

After identifying and locating the tract servers associated with the tract identifiers, step 510 communicates the byte sequence to the tract servers with instructions to store respective byte sequence portions at corresponding block-level addresses in parallel. The tract servers, in turn, write the byte sequence portions to assigned tracts simultaneously or near simultaneously. The byte sequence portions may be transmitted over a network using parallel BLOB based storage instructions. Step 510 subsequently proceeds to step 516 where the input/output request is completed. In one example implementation, the one or more parallel storage components may communicate a notification acknowledging successful completion of the write operation.

Steps 512 and 514 are directed to handling the read operation with block-level granularity. Step 512 represents the translation of byte sequence locations, based upon the file data representation, into block-level addresses in which each such address comprises a tract identifier and a block index. These byte sequence locations may be extracted from an input/output request associated with the read operation. Each tract identifier refers to a particular tract server for maintaining the requested byte sequence. Step 514 identifies and accesses corresponding tract servers, which respond by transmitting the requested byte sequence, in parallel, via a network. Step 516 completes the input/output request by indicating a successful execution of the read operation. Step 518 terminates the example steps depicted in FIG. 5.

Example Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 6:
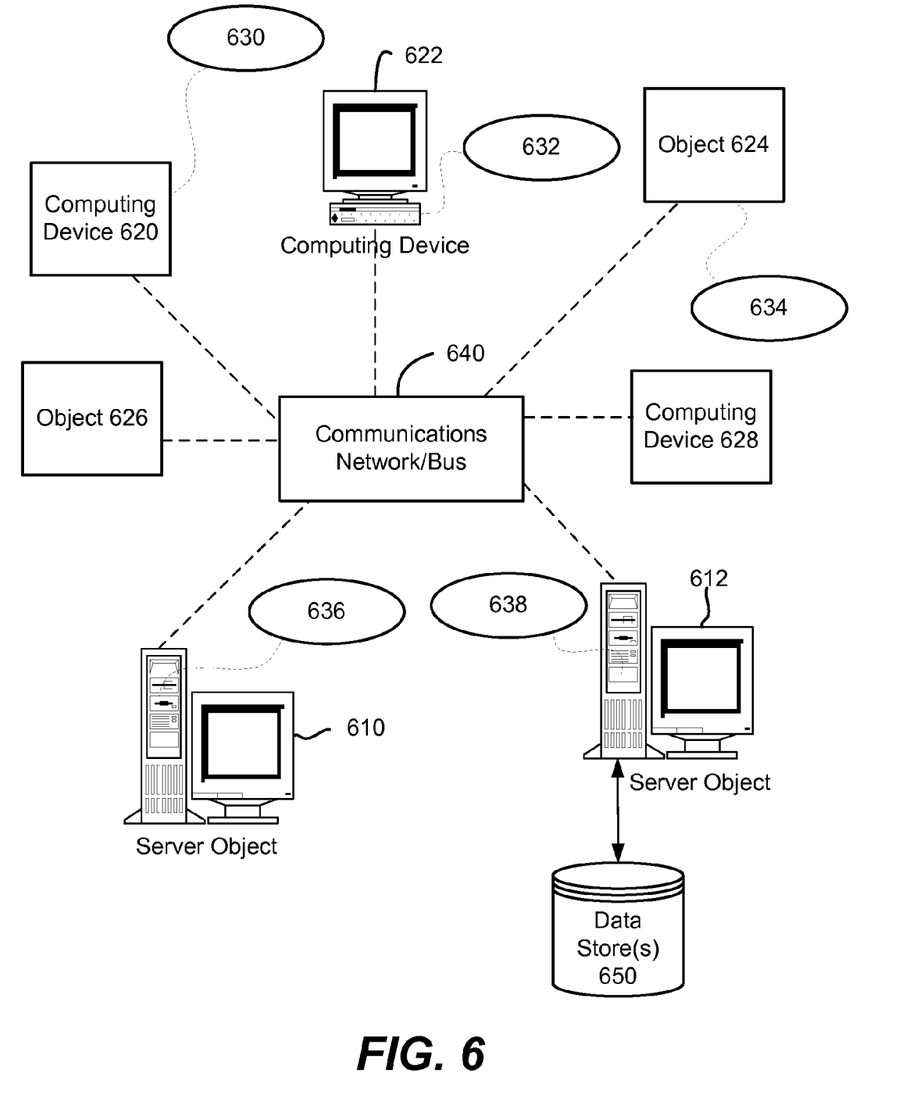
FIG. 6 is a block diagram representing example non-limiting networked environments in which various embodiments described herein can be implemented.

FIG. 6 provides a schematic diagram of an example networked or distributed computing environment. The distributed computing environment comprises computing objects 610, 612, etc., and computing objects or devices 620, 622, 624, 626, 628, etc., which may include programs, methods, data stores, programmable logic, etc. as represented by example applications 630, 632, 634, 636, 638. It can be appreciated that computing objects 610, 612, etc. and computing objects or devices 620, 622, 624, 626, 628, etc. may comprise different devices, such as personal digital assistants (PDAs), audio/video devices, mobile phones, MP3 players, personal computers, laptops, etc.

Each computing object 610, 612, etc. and computing objects or devices 620, 622, 624, 626, 628, etc. can communicate with one or more other computing objects 610, 612, etc. and computing objects or devices 620, 622, 624, 626, 628, etc. by way of the communications network 640, either directly or indirectly. Even though illustrated as a single element in FIG. 6, communications network 640 may comprise other computing objects and computing devices that provide services to the system of FIG. 6, and/or may represent multiple interconnected networks, which are not shown. Each computing object 610, 612, etc. or computing object or device 620, 622, 624, 626, 628, etc. can also contain an application, such as applications 630, 632, 634, 636, 638, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for example communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 6, as a non-limiting example, computing objects or devices 620, 622, 624, 626, 628, etc. can be thought of as clients and computing objects 610, 612, etc. can be thought of as servers where computing objects 610, 612, etc., acting as servers provide data services, such as receiving data from client computing objects or devices 620, 622, 624, 626, 628, etc., storing of data, processing of data, transmitting data to client computing objects or devices 620, 622, 624, 626, 628, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 640 or bus is the Internet, for example, the computing objects 610, 612, etc. can be Web servers with which other computing objects or devices 620, 622, 624, 626, 628, etc. communicate via any of a number of known protocols, such as the hypertext transfer protocol (HTTP). Computing objects 610, 612, etc. acting as servers may also serve as clients, e.g., computing objects or devices 620, 622, 624, 626, 628, etc., as may be characteristic of a distributed computing environment.

In another network environment, the communications network 640 or bus is a full-bisection circuit-switching network interconnecting the computing objects 610, 612, etc. with other computing objects or devices 620, 622, 624, 626, 628, etc. Computing objects 610, 612, etc. can communicate with other computing objects or devices 620, 622, 624, 626, 628, etc. via any of a number of known protocols including, but not limited to, ATA over Ethernet (AoE), Internet Small Computer System Interface (iSCSI), Fibre Channel over Ethernet (FCoE) and/or the like. Computing objects 610, 612, etc. can execute compatible storage commands on data store(s) 650 corresponding to input/output requests from other computing objects or devices 620, 622, 624, 626, 628, etc.

Data store(s) 650 may refer to parallel storage, as described herein, in which remote disks function as local storage to other computing objects or devices 620, 622, 624, 626, 628, etc. Computing objects 610, 612, etc. operate as front-ends to one or more remote disks and parallelize block-level input/output such that data is written or read substantially in parallel. One embodiment of parallel storage can refer to a Binary Large Object (BLOB) based storage system, such as Microsoft® Flat DataCenter Storage (FDS), in which one or more parallel storage components translate file-level addresses corresponding to a virtual storage extent (e.g., a virtual hard disk (file)) into block-level addresses corresponding to locations within data store(s) 650 and generate BLOB-based storage commands that are executed simultaneously.

Operating system components running on other computing objects or devices 620, 622, 624, 626, 628, etc. can mount one or more parallel storage components in order to achieve block-level access over parallel storage and store/retrieve data within a virtual storage extent or other file data. Alternatively, via one or more parallel storage components, operation system components also can network-boot other computing objects or devices 620, 622, 624, 626, 628, etc., or another virtual machine, using a virtual storage extent.

Example Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 7 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 7:
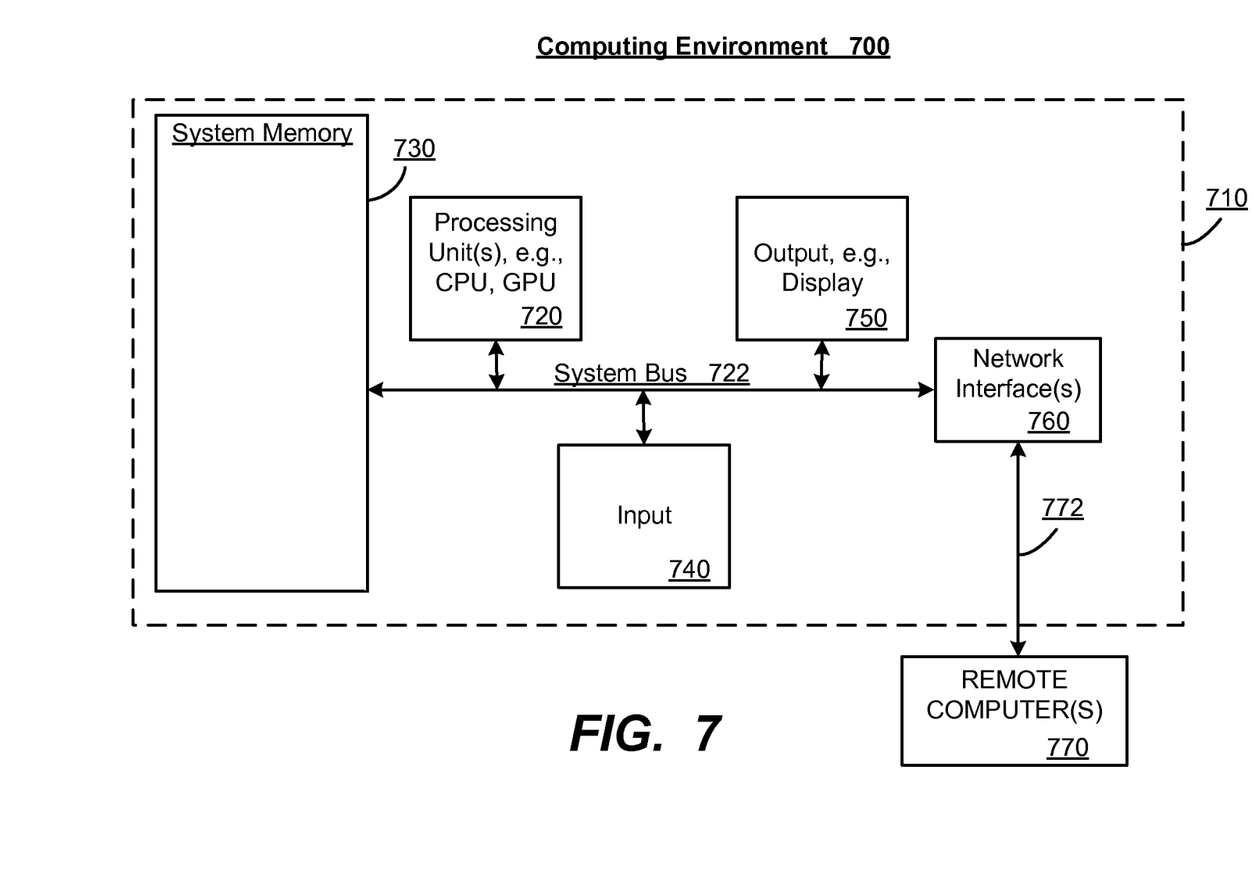
FIG. 7 is a block diagram representing an example non-limiting computing system or operating environment in which one or more aspects of various embodiments described herein can be implemented.

FIG. 7 thus illustrates an example of a suitable computing system environment 700 in which one or more aspects of the embodiments described herein can be implemented, although as made clear above, the computing system environment 700 is only one example of a suitable computing environment and is not intended to suggest any limitation as to scope of use or functionality. In addition, the computing system environment 700 is not intended to be interpreted as having any dependency relating to any one or combination of components illustrated in the example computing system environment 700.

With reference to FIG. 7, an example remote device for implementing one or more embodiments includes a general purpose computing device in the form of a computer 710. Components of computer 710 may include, but are not limited to, a processing unit 720, a system memory 730, and a system bus 722 that couples various system components including the system memory to the processing unit 720.

Computer 710 typically includes a variety of computer readable media and can be any available media that can be accessed by computer 710. The system memory 730 may include computer storage media in the form of volatile and/or nonvolatile memory such as read only memory (ROM) and/or random access memory (RAM). By way of example, and not limitation, system memory 730 may also include an operating system, application programs, other program modules, and program data.

A user can enter commands and information into the computer 710 through input devices 740. A monitor or other type of display device is also connected to the system bus 722 via an interface, such as output interface 750. In addition to a monitor, computers can also include other peripheral output devices such as speakers and a printer, which may be connected through output interface 750.

The computer 710 may operate in a networked or distributed environment using logical connections to one or more other remote computers, such as remote computer 770. The remote computer 770 may be a personal computer, a server, a router, a network PC, a peer device or other common network node, or any other remote media consumption or transmission device, and may include any or all of the elements described above relative to the computer 710. The logical connections depicted in FIG. 7 include a network 772, such local area network (LAN) or a wide area network (WAN), but may also include other networks/buses. Such networking environments are commonplace in homes, offices, enterprise-wide computer networks, intranets and the Internet.

As mentioned above, while example embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a system comprising:
a translator component coupled to a plurality of storage nodes and operative to parallelize input/output operations associated with file data within a binary large object, the plurality of storage nodes being associated with parallel storage of portions of the binary large object and each storage node being operative to serve a portion of the portions within a processing cycle, the translator component further operative to partition the file data into a plurality of blocks of which each block size is equal to the portion size, translate file-level addresses corresponding to offsets in the plurality of blocks into block-level addresses corresponding to an offset in the portion being served by the each storage node, and using the block-level addresses to retrieve the plurality of blocks within the processing cycle when handling the input/output operations.

2. The system of claim 1, wherein the translator component further operative to map a byte offset in the file data to a block offset within the portions of the binary large object.

3. The system of claim 1, wherein the translator component further operative to map a block sequence to random locations within the portions of the plurality of storage nodes.

4. The system of claim 1 further comprising a plurality of computing devices communicably coupled, within a physical boundary, to a storage node group, wherein the plurality of computing devices and the storage node group communicate data over a full bi-sectional bandwidth network.

5. The system of claim 1, wherein the translator component further operative to modify the block size.

6. The system of claim 1, wherein the translator component further operative to generate a file data representation comprising the block-level addresses and provide the file data representation to a computing device that uses the file data representation to initiate file system operations over a local area network.

7. In a computing environment, a method comprising:
parallelizing input/output operations associated with file data within a binary large object, a plurality of storage nodes being associated with parallel storage of portions of the binary large object and each storage node being operative to serve a portion of the portions within a processing cycle;
partitioning the file data into a plurality of blocks of which each block size is equal to the portion size;
translating file-level addresses corresponding to offsets in the plurality of blocks into block-level addresses corresponding to an offset in the portion being served by the each storage node; and
using the block-level addresses to retrieve the plurality of blocks within the processing cycle when handling the input/output operations.

8. The method of claim 7 further comprising mapping a byte offset in the file data to a block offset within the portions of the binary large object.

9. The method of claim 7 further comprising mapping a block sequence to random locations within the portions of the plurality of storage nodes.

10. The method of claim 7 wherein a plurality of computing devices are communicably coupled, within a physical boundary, to a storage node group, wherein the plurality of computing devices and the storage node group communicate data over a full bi-sectional bandwidth network.

11. The method of claim 7 further comprising modifying the block size.

12. The method of claim 7 further comprising generating a file data representation comprising the block-level addresses and providing the file data representation to a computing device that uses the file data representation to initiate file system operations over a local area network.

13. One or more computer-readable hardware media having computer-executable instructions stored thereon, which cause a computer to perform steps comprising:
parallelizing input/output operations associated with file data within a binary large object, a plurality of storage nodes being associated with parallel storage of portions of the binary large object and each storage node being operative to serve a portion of the portions within a processing cycle;
partitioning the file data into a plurality of blocks of which each block size is equal to the portion size;
translating file-level addresses corresponding to offsets in the plurality of blocks into block-level addresses corresponding to an offset in the portion being served by the each storage node; and
using the block-level addresses to retrieve the plurality of blocks within the processing cycle when handling the input/output operations.

14. The one or more computer-readable hardware media of claim 13 having further computer-executable instructions that cause the computer to perform further steps comprising:
mapping a byte offset in the file data to a block offset within the portions of the binary large object.

15. The one or more computer-readable hardware media of claim 13 having further computer-executable instructions that cause the computer to perform further steps comprising:
mapping a block sequence to random locations within the portions of the plurality of storage nodes.

16. The one or more computer-readable hardware media of claim 13 wherein a plurality of computing devices are communicably coupled, within a physical boundary, to a storage node group, wherein the plurality of computing devices and the storage node group communicate data over a full bi-sectional bandwidth network.

17. The one or more computer-readable hardware media of claim 13 having further computer-executable instructions that cause the computer to perform further steps comprising:
   modifying the block size.

18. The one or more computer-readable hardware media of claim 13 having further computer-executable instructions that cause the computer to perform further steps comprising:
   generating a file data representation comprising the block-level addresses and providing the file data representation to a computing device that uses the file data representation to initiate file system operations over a local area network.

* * * * *